US008001479B2

(12) United States Patent  
Katsuranis et al.

(10) Patent No.: US 8,001,479 B2  
(45) Date of Patent: Aug. 16, 2011

(54) SYSTEM AND METHODS TO ACCESS COMPUTER FILES AND POSITION AND CONTROL APPLICATION WINDOW(S) ON A GRAPHICAL USER INTERFACE

(76) Inventors: Ronald Mark Katsuranis, Belmont, CA (US); Evan Glenn Katsuranis, Davis, CA (US)

( * ) Notice: Subject to any disclaimer, the term of this patent is extended or adjusted under 35 U.S.C. 154(b) by 448 days.

(21) Appl. No.: 11/097,641

(22) Filed: Apr. 2, 2005

(65) Prior Publication Data

US 2006/0224963 A1    Oct. 5, 2006

Related U.S. Application Data

(63) Continuation-in-part of application No. 10/775,587, filed on Feb. 9, 2004, now Pat. No. 7,461,352.

(60) Provisional application No. 60/559,326, filed on Feb. 3, 2004.

(51) Int. Cl.  
*G06F 15/00* (2006.01)  
*G06F 13/00* (2006.01)

(52) U.S. Cl. ........... 715/763; 715/765

(58) Field of Classification Search .......... 715/763–765, 715/851–853, 740–743  
See application file for complete search history.

(56) References Cited

U.S. PATENT DOCUMENTS

| | | | | |
|---|---|---|---|---|
| 5,191,644 | A | * | 3/1993 | Takeda ........................... 715/790 |
| 5,564,002 | A | | 10/1996 | Brown ........................... 345/778 |
| 5,657,463 | A | | 8/1997 | Bingham ........................ 345/799 |
| 5,757,371 | A | | 5/1998 | Oran et al. ..................... 715/779 |
| 5,838,318 | A | | 11/1998 | Porter et al. |
| 5,974,384 | A | * | 10/1999 | Yasuda .......................... 704/275 |
| 5,983,184 | A | * | 11/1999 | Noguchi ....................... 704/270 |
| 6,011,551 | A | | 1/2000 | Amro |
| 6,025,841 | A | | 2/2000 | Finkelstein .................... 715/803 |
| 6,215,490 | B1 | * | 4/2001 | Kaply ............................ 715/788 |
| 6,233,559 | B1 | * | 5/2001 | Balakrishnan ................ 704/275 |
| 6,353,436 | B1 | | 3/2002 | Reichlen ....................... 345/427 |
| 6,424,357 | B1 | * | 7/2002 | Frulla et al. .................. 715/728 |
| 6,473,102 | B1 | | 10/2002 | Rodden et al. ................ 345/788 |
| 6,668,244 | B1 | * | 12/2003 | Rourke et al. ................ 704/275 |
| 7,036,080 | B1 | * | 4/2006 | James et al. .................. 715/728 |
| 2006/0168014 | A1 | * | 7/2006 | Wang ............................ 709/206 |

* cited by examiner

*Primary Examiner* — Kevin Nguyen  
(74) *Attorney, Agent, or Firm* — Howard H. Sheerin

(57) ABSTRACT

The invention enables a computer user to issue voice commands to open computer readable files and control and/or position their associated graphical application windows on a graphical user interface. Further, the operator can issue voice commands to precisely position and control application window(s) on a graphical user interface displayed on either one or a plurality of display monitors, so that the information contained in the application windows is visible, organized, and available on the computer desktop to the user when and where he/she needs it.

30 Claims, 14 Drawing Sheets

141

Computer user is working in this document and wants to copy text from an internet site here: Creators of VoiceTeach®, the only voice-controlled help, demonstration, and training system for Dragon NaturallySpeaking Professional and other voice recognition programs..

VoiceWare Systems' trainers, working in conjunction with VoiceTeach® have helped our clients to obtain a level of proficiency unequalled by any other speech recognition training program. VoiceTeach® has enabled us to cut training costs significantly because VoiceTeach®:

FIG. 14

SYSTEM AND METHODS TO ACCESS COMPUTER FILES AND POSITION AND CONTROL APPLICATION WINDOW(S) ON A GRAPHICAL USER INTERFACE

CROSS-REFERENCE TO RELATED APPLICATIONS

This application is a continuation in part of U.S. patent application Ser. No. 10/775,587, filed on Feb. 9, 2004 now U.S. Pat. No. 7,461,352 and claims priority from U.S. Provisional Patent Application No. 60/559,326 filed on Feb. 3, 2004.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

BACKGROUND OF THE INVENTION

1. Field of Invention

The present invention relates to a system and methods to access computer files and position and control application window(s) on a Graphical User Interface 2. Prior Art The present invention relates generally to the control and display of a window or a plurality of windows on the computer display screen of a graphical user windowing environment.

Using a graphical user interface (GUI) with a conventional multitasking operating system, a computer user typically opens numerous graphical application windows containing documents, Web pages, help information, pictures, e-mail, instant messaging, database information and other content.

As he/she works, the computer user will toggle between the various graphical windows. However, as the user opens other application windows, the user's original graphical application window may become partially or totally obscured by one or more other application windows that the computer user opens as illustrated in FIG. 1. Other application windows that the user was working with get 'lost' behind all the other windows.

Concisely stated, the problem encountered with conventional GUI's is that management of multiple windows is awkward, slow and imprecise so that the information contained in the graphical application windows is frequently not visible, not usable, or unavailable to the user when and where he/she needs it.

Prior Art offers a variety of tools to help the computer operator. These include the Microsoft Task Manager FIG. 2 (U.S. Pat. No. 5,757,371) that lists application windows on the desktop 21; U.S. Pat. No. 6,215,490 that helps users locate desired windows; and the Macintosh Finder that enables a user to view a graphical representation of the files open on the desktop. Both these 'task managers' allow a user to select an open application, switch to it, or to minimize, maximize, close or tile it. But, these task managers both require several steps to switch to and size an application 21, are not easy to control via voice or a couple of keystrokes, only allow limited sizing and positioning options 22, only list open programs and documents and do not even allow for simple control of the programs/documents that are listed.

If the computer user chooses to switch to a graphical application FIG. 3, the newly activated graphical window may be poorly positioned, cover up anther document being referenced or have the wrong size 31, necessitating the computer user to resize and reposition the window.

If the computer user merely wished to view the content of a graphical application, prior art offers no relief. The computer user first needs to switch to the graphical application, then resize it so it doesn't cover up the user's working application, then place focus back into the user's working application.

Prior Art 'task managers' also offer little help to a computer user who wishes to position a plurality of graphical application windows on a computer display or displays. A computer user who wishes to position a plurality of application windows so that they can be viewed simultaneously needs to individually size and position each graphical window.

Similarly, prior art file management programs such as Windows Explorer, offer little help to a user who wishes to open a plurality of computer readable files and position them so they can be simultaneously viewed.

For example, a computer user who is writing an e-mail in a first application window and wishes to copy some material contained in a word processing document open on the desktop may need to go through the following steps:

Bring up the task manager to identify the word processing document; switch to a document in a second application window and realize that he/she has switched to the wrong document; bring up the task manager again; switch to the correct document a third application window; scroll through the document and find some of the desired text; select & copy it; minimize the third application window to facilitate switching back to the first application window; realize that the second application window is obscuring the first application window; minimize the second application window; click back into the first application window to give it focus; move down to your original position and finally paste the text.

Many other solutions are offered in the prior art, including U.S. Pat. Nos. 6,025,841, 6,473,102, 5,191,644, 6,353,436, 5,564,002, and 5,657,463. As an example, U.S. Pat. No. 6,025,841 provides a continuous, automatic adjustment to the window size and position of a selected (topmost) window by monitoring a user's interaction with a computer system. This may prevent a window from getting lost (even if the computer user may want to temporarily cover it up), but it doesn't guarantee that it's going to be in a useful location and that the right content is available to the user when and where he/she wants to see it.

No prior art solves the problem encountered with conventional GUI's. Management of multiple windows remains awkward, slow and imprecise so that the information contained in the graphical application windows is frequently not visible, not usable, or unavailable to the user when and where he/she needs it.

Prior art speech recognition technology merely substitutes speech commands for keyboard and mouse commands and has not solved any of the issues of switching between or positioning one or more application windows, losing focus and obstruction of the computer user's view of his or her first application. Prior art speech recognition technology usually makes it more difficult for a user to switch to and control his/her graphical application windows than keyboarding or mousing and much more difficult to navigate through a computer's drive, directory and subdirectory structure to find and open the needed files and objects by voice.

There remains a need to provide an efficient and simple technique for enabling a user easily and quickly locate, size and position open application windows and computer readable files in a graphical user interface windowing environment so that the information contained in the graphical application windows is visible, usable, and available to the user when and where he/she needs it.

The present invention solves this problem.

BRIEF SUMMARY OF THE INVENTION

The present invention addresses the foregoing difficulties and offers an enhanced system with additional capabilities. The present invention creates new systems and methods for controlling existing graphical interface windowing environments which are applicable to computer systems including personal computers, tablet PC's, workstations and PDAs.

The invention makes it easier to access computer information and/or applications.

The preferred embodiment of the present invention provides systems and methods that enable a computer user to remain in productive control of a working application while issuing a speech command or commands to:

Simultaneously resize and/or reposition any specified graphical application window or specified plurality of application windows or all graphical application windows open on the desktop, so that the information contained in the graphical application windows is visible, organized, and available to the user when and where he/she needs it;

Cause the invention to send a command to the specified application(s) to perform the specified control(s) of the specified application(s);

Search for, locate, organize, and display lists (or graphical representations) of the specified computer readable files, folders, drives and other objects;

Open any specified computer readable file or files and to position the graphical application windows associated with the files so that the information contained in the graphical application windows is visible, usable, and available to the user when and where he/she needs it;

Cause the invention to instruct the operating system to perform the specified control of the specified computer readable files.

This brief summary has been provided so that the nature of the invention may be understood quickly. Other features and advantages of the present invention will become apparent from the following description taken in conjunction with the accompanying drawings.

BRIEF DESCRIPTION OF THE SEVERAL VIEWS OF THE DRAWINGS

Figure 9:
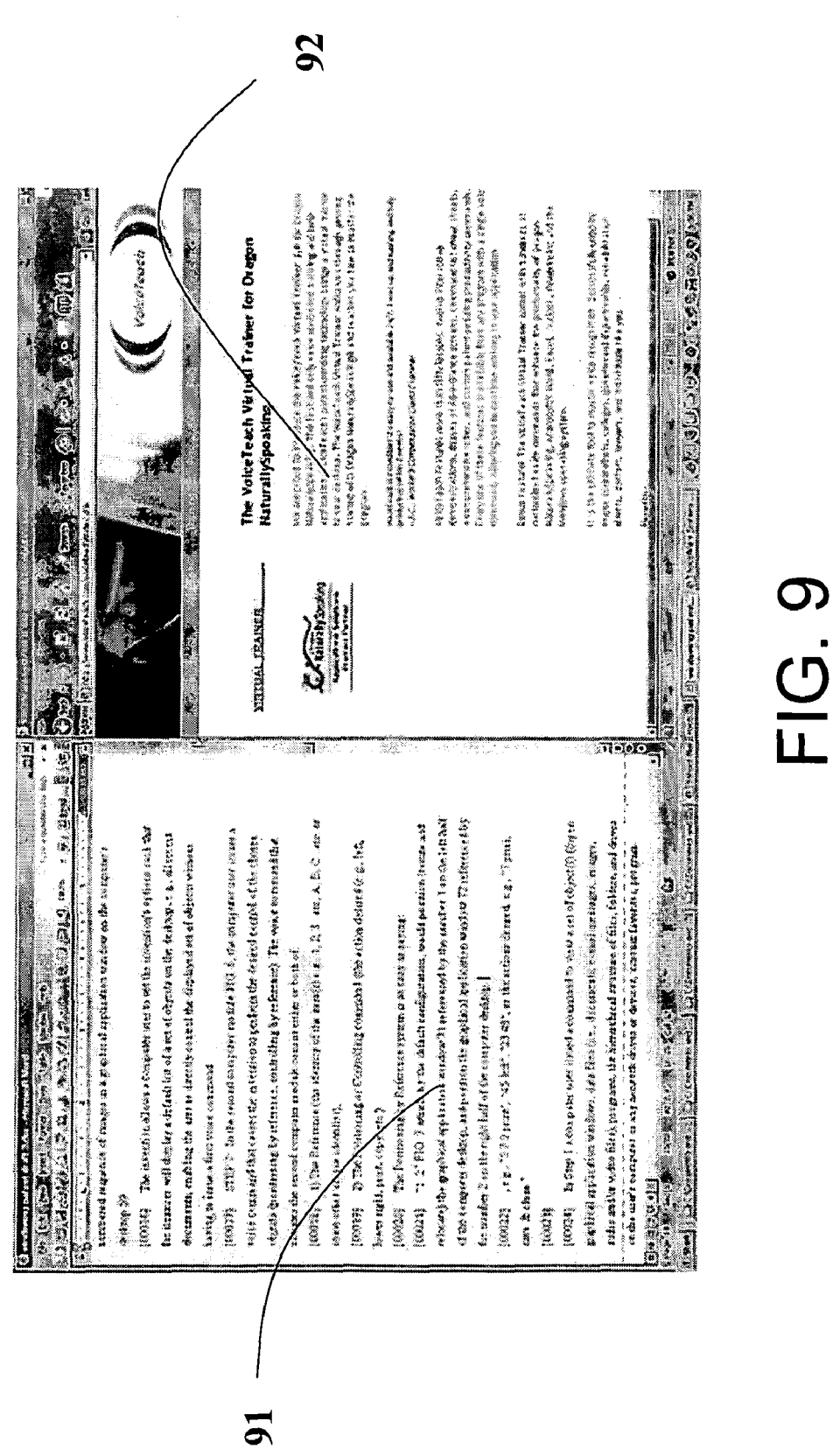

FIG. 9 is a representative screen display of the invention's tiling of two application windows on a computer system with one display screen in response to an invention command.

FIG. 14 is a representative screen display of a computer's users original application with text pasted at the user's original cursor position resulting from an invention command.

DETAILED DESCRIPTION OF THE INVENTION

The present invention, generally, is a system and method providing a computer user increased control of graphical application windows on the computer desktop, computer readable files and objects. More particularly, the invention enables a computer user to issue voice commands to open computer readable files and control and/or position their associated graphical application windows on a graphical user interface. Further, the operator can issue voice commands to precisely position and control application window(s) on a graphical user interface The present invention bringing a new ease of use and level of control of the computer environment to a computer user.

In this section we will provide a description of the computer hardware and software requirements. Then the basic windowing concepts used by the invention are described. Next a brief description about voice recognition command files is provided. And last the preferred embodiment is described in detail.

The present invention shall be described with respect to a Windows based operating system and ScanSoft's Dragon NaturallySpeaking product. However, the invention, as disclosed herein, is not so limited. Instead, the invention can be used with most voice recognition systems, including IBM's ViaVoice and Microsoft's Speak and it can be controlled by keyboard and/or other devices. The invention is designed to operate with any one of several commercially available operating systems, which incorporate a graphical user interface. In this embodiment, the invention uses both the Dragon NaturallySpeaking scripting language and the WinBatch editor/compiler. Many other programming languages, including "C" and Visual Basic, may be used.

Figure 1:
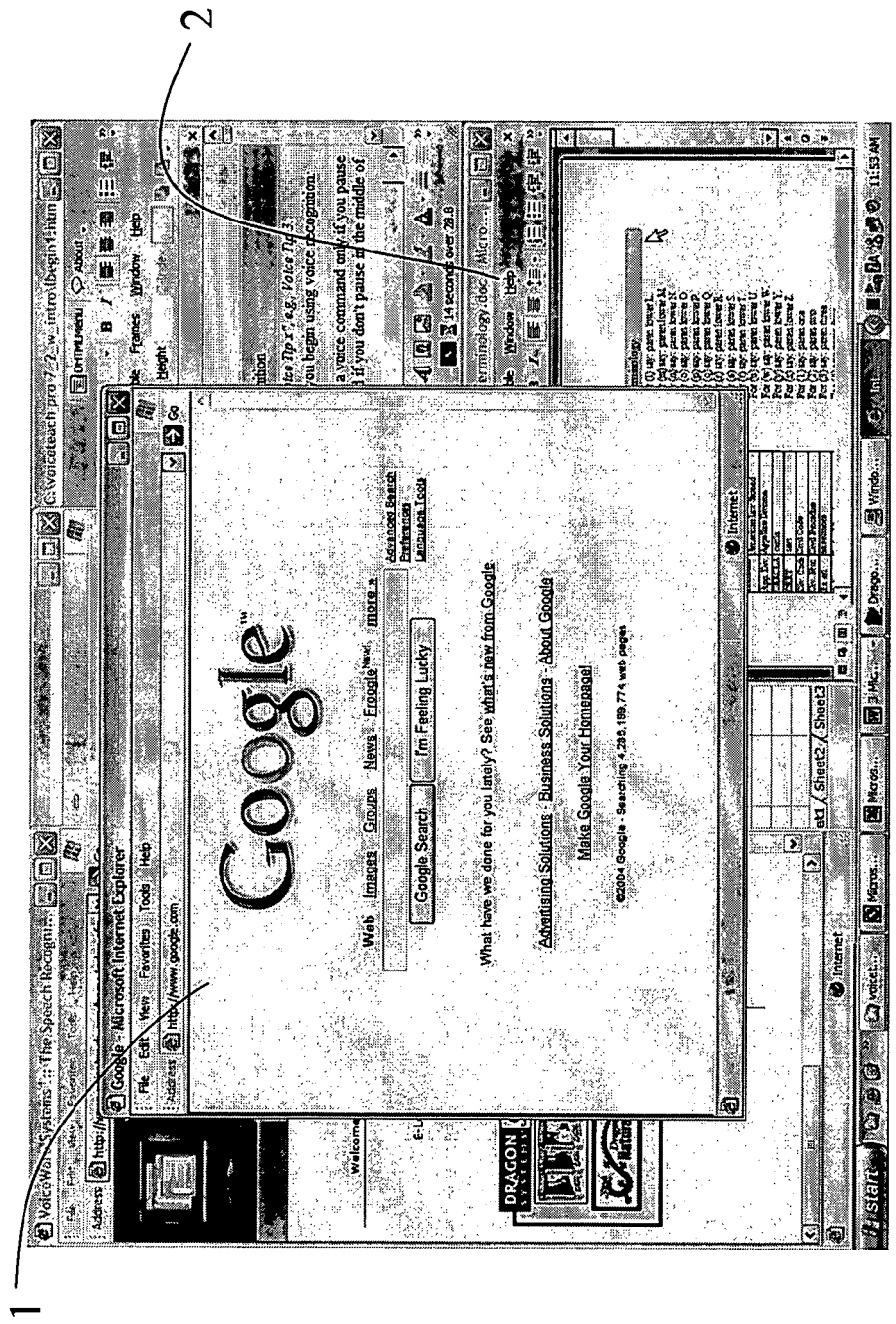
FIG. 1 (prior art) is a representative screen display of a prior art graphical user interface desktop.
Figure 2:
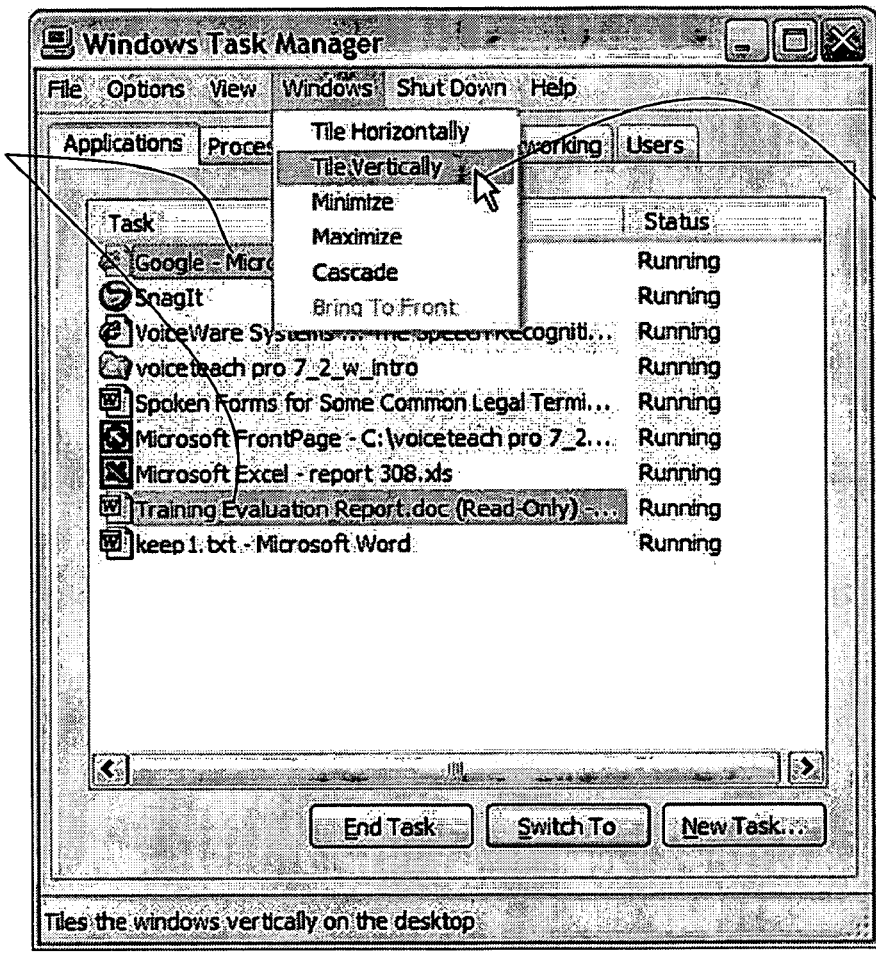
FIG. 2 (prior art) is a representative screen display of Microsoft Windows' Task Manager.
Figure 3:
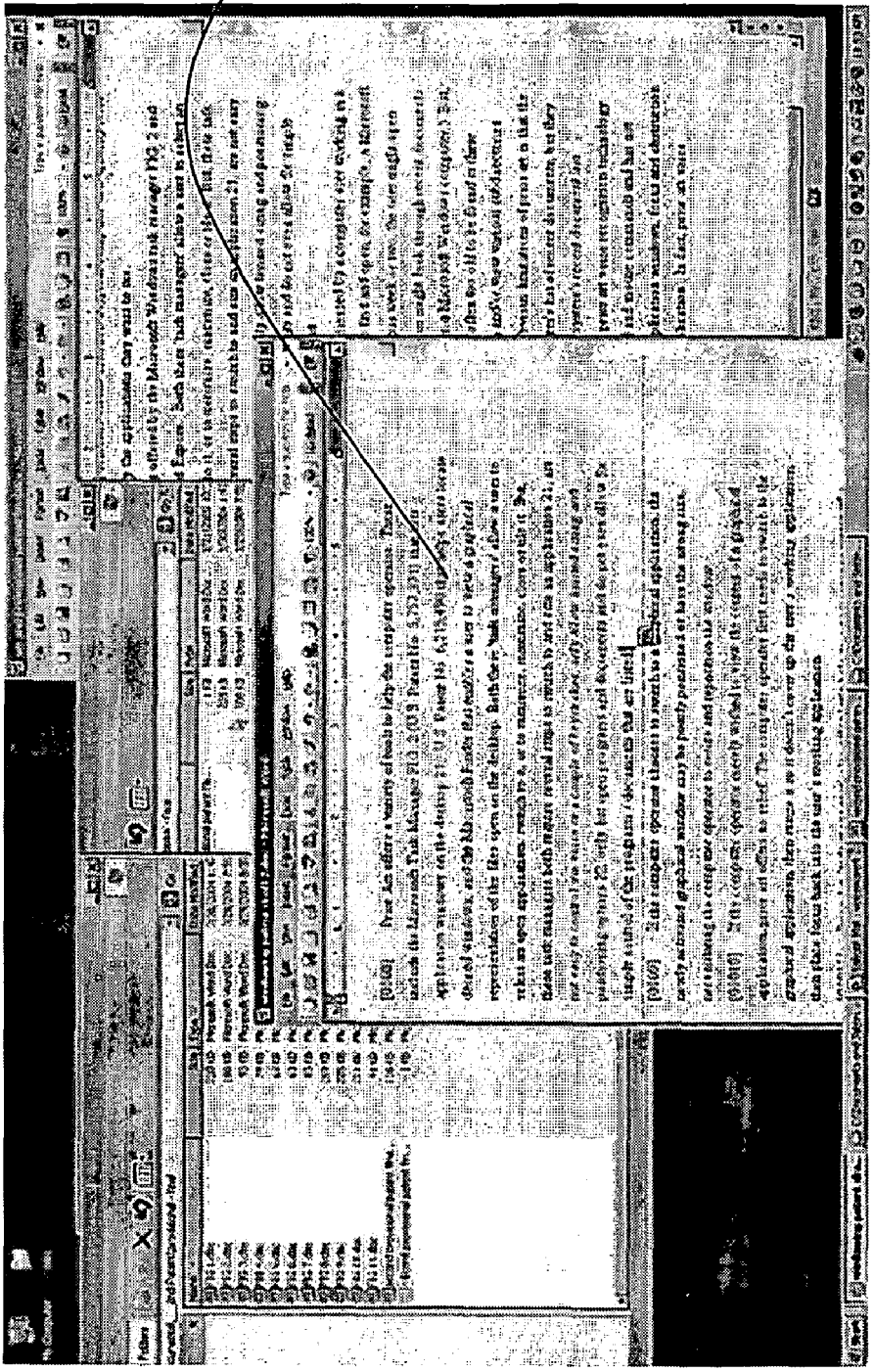
FIG. 3 (prior art) is a representative screen display of Microsoft Windows' with several graphical application windows open on the desktop.
Figure 4:
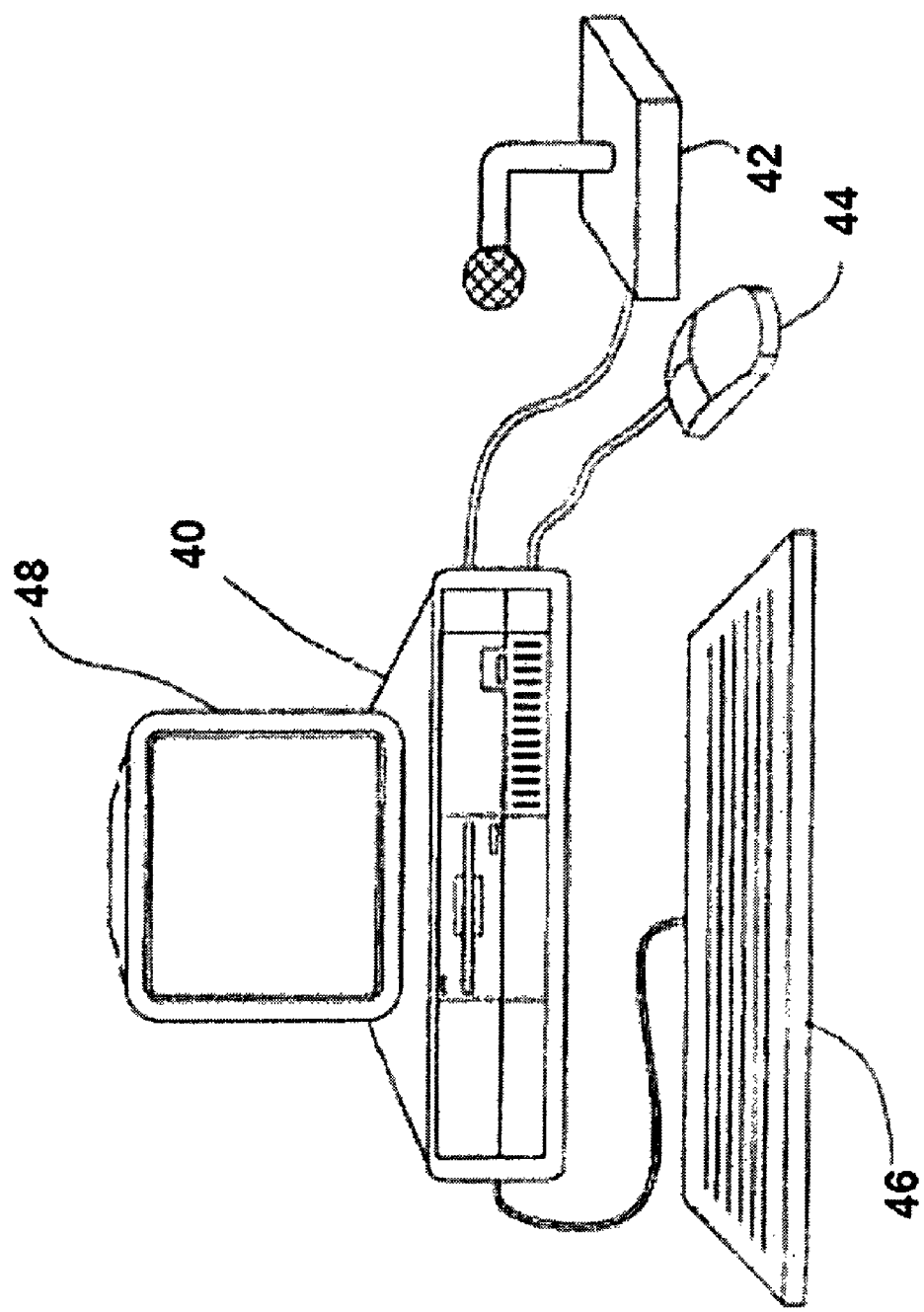
FIG. 4 is a diagrammatic illustration of a computer executing a computer application according to an example implementation of this invention.

FIG. 4 illustrates, generally, the environment utilizing the present invention. In FIG. 4, the invention is described within the illustrated context of a familiar desktop computer. An example computer 40 includes a Pentium IV or equivalent microprocessor with at least two hundred and fifty-six or more megabytes of RAM running the Microsoft Windows 2000 Professional operating system. This example computer is capable of running a multitasking operating system with a graphical user interface windowing environment. However, aspects of this invention might also be employed in other forms of computing devices such as laptop computers, hand held computers, tablet PC's, portable personal information managers (PIMs), and the like. In these devices, the application may be configured to run on a single-tasking operating system.

For the preferred embodiment, the computing device must include an internal audio input and output circuit, commonly referred to as a "sound card" or an external device such as a USB sound digitizing device. A microphone 42 is connected to the audio input. The sound card converts digital information from the computer into audio signals and digitizes audio signals received from the microphone into data that can be manipulated by the microprocessor and other components of the computer. The computing device can also include a conventional keyboard 46 and mouse 44, allowing the user to input information in a conventional fashion. A video monitor 48 is provided for the display of information by the computer.

Turning to basic window concepts, the present invention is concerned with displaying and controlling graphical window applications.

In a graphical user interface, a graphical application window can display an application program or the contents of files, whether that file contains Web pages, help information, e-books, or other information content. Graphical application windows can be opened full-screen or can be sized and positioned anywhere on the desktop. A graphical application window can be open on the desktop but its content can be partially or totally obscured by other windows also open on the desktop. A graphical application window is said to have "focus" when it is active and currently designated to receive the user input from the keyboard, mouse, or from a voice recognition system: A window can be open but positioned off the computer's screen so that it is hidden from the user. Windows that are displayed adjacent to one another are referred to as "tiled windows."

To understand the invention, it is necessary to know how voice recognition systems distinguish commands from non-command words. Commands are stored in command files. The speech engine reads its command files when it is opened and places the commands listed in the command files into active memory, making these commands "active", allowing the speech recognition engine to recognize these commands when spoken by a computer user. This is typical of the art. To instruct a voice recognition system to understand the invention's spoken commands, this invention adds the invention's command list 55 to that of the speech engine's command list, which is then read by the speech recognition engine.

However, there is an art to constructing speech commands that can be consistently understood by a speech recognition engine. First, one or two syllable commands are usually unreliable because they are too easily misunderstood by current speech recognition technology. Second, every word in a command statement must be able to be consistently understood by the speech recognition engine to give reliable results. And third, command statements must be able to be easily said or users will stumble and not say the command correctly.

Generally speaking, numbers are much more consistently understood and more easily pronounced than names. Simple command words can increase the accurate recognition of a command statement by a speech engine. For example, the command, "Show 5 right" would be understood far more consistently than a command, "solidtek mic right."

The invention stores five types of commands in its command list: show commands, task commands, position commands, control commands and a cancel command. As will be elaborated in the following text, show commands direct the invention to create a list or a uniquely identified set of objects 59, task commands direct the invention to execute commands on open application windows listed on the computer desktop's task list 51, positioning commands direct the invention to size and position applications windows or files listed in the invention's list 59, control commands direct the invention to control an application, and the cancel command directs the invention to close.

Different speech engines and different versions of the same speech engine have various ways of storing commands and use different scripting or programming languages. Other embodiments of this program will work with speech engines through their own scripting languages or through third-party scripting languages. These scripting languages act as an intermediary between a commercial speech engine and a programming language, such as "C" or WinBatch, which are required for this invention.

To use the invention a speech recognition engine is open on the desktop. The microphone is on and active.

Figure 6:
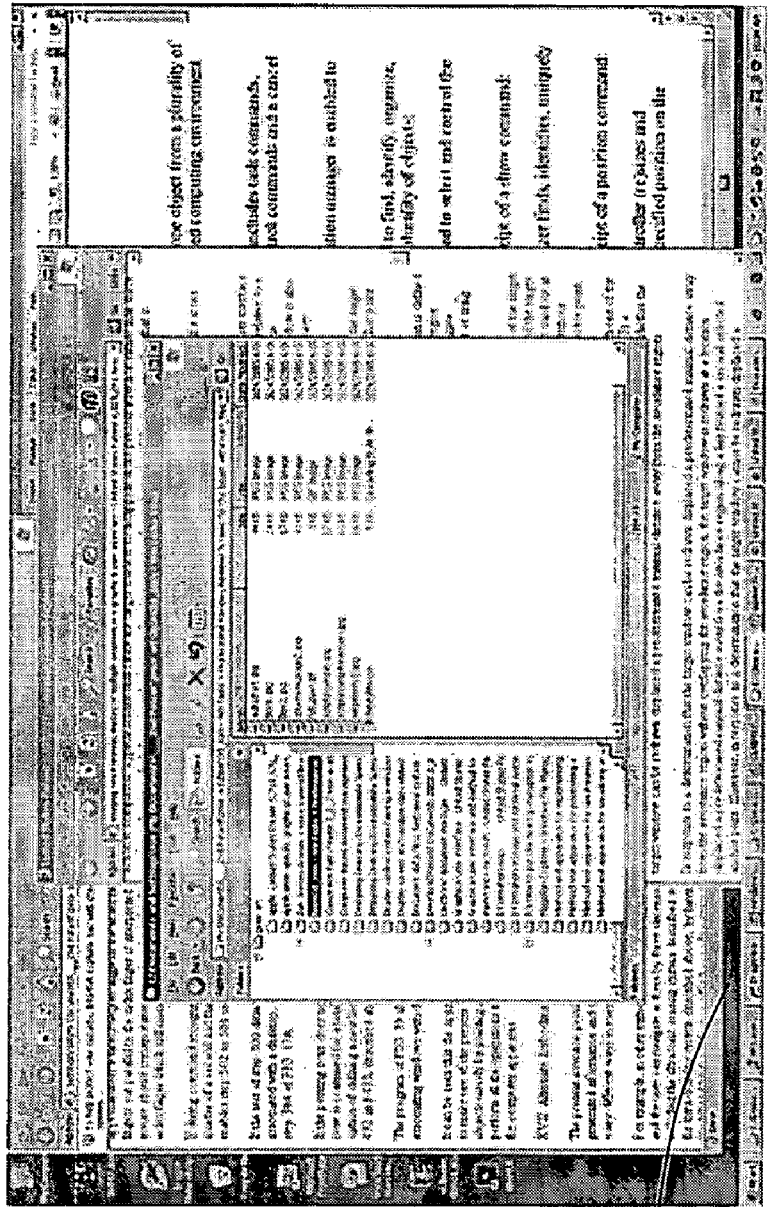
FIG. 6 is a representative screen display of Microsoft Windows' with several graphical application windows open on the desktop with numbering to illustrate the relative positions of the icons on the task bar.

If a computer user has a plurality of windows open on the desktop FIG. 6, with some windows partially obscured and others hidden behind other open windows, he/she can quickly organize the desktop with two voice commands.

STEP 1: In the preferred embodiment, the user issues a show command to view the open graphical application windows on the desktop: "Show Task List"

The speech recognition engine will recognize the command as belonging to the invention's command list and will pass the command to the invention's application manager 56 which parses out the command being sent.

The application manager performs the following steps:

First, the application manager parses out the command words to determine what type of command has been received:

When the invention parses out the command words in the sample command, 'show,' & 'task list,' it will identify the command as a show command and invoke the itemizer 57, passing to the itemizer the type of objects requested by the user (in this example, open application windows) and any parameters.

The itemizer will search for the objects in the set requested, in this example graphical application windows open on the desktop, extract the names, and uniquely label them.

The itemizer displays the uniquely labeled list of the names of the open graphical applications in an application window 59. In another embodiment, it will display a uniquely labeled arrangement of graphical application windows on the computer's desktop.

Figure 7:
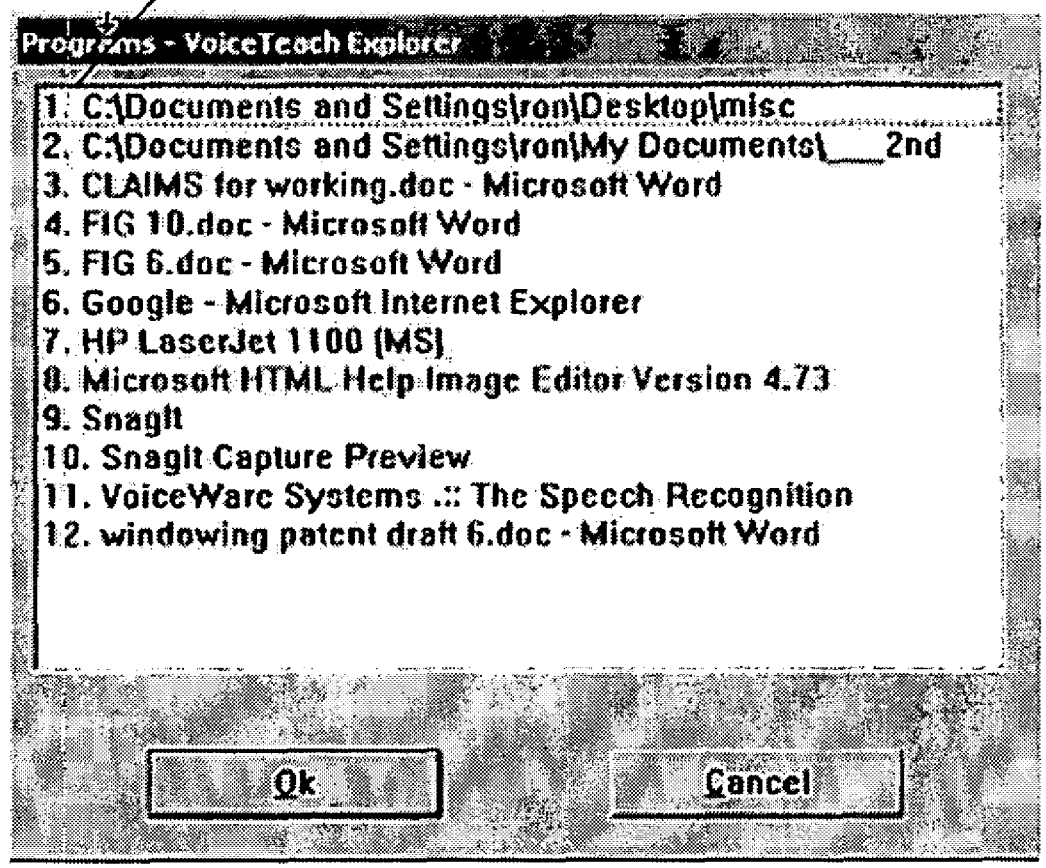
FIG. 7 is a representative screen display of the invention's list of open graphical application files on the computer desktop.

With the numbered list of open application windows open on the desktop FIG. 7, the value of the Invention's uniquely labeled list or graphical display becomes clear to a computer operator. The uniquely labeled list 71 allows the invention to construct straightforward command statements that are consistently recognized by the speech recognition engine enabling the computer user to describe exactly what positioning he/she wishes to perform on which objects with a simple voice command. Some example commands statements include: "Place 7 Left," "Place 13 Right," "Place 3 Max (or maximized)," and "Place 3 13 1 7."

STEP 2: The computer user issues a second voice command that causes the invention to perform the desired positioning of one, some, or all of the items in the uniquely labeled list 61. The computer user says:

"Place 3 4 5"

This second voice command consists of:

1) A command word to help make the recognition of the command more consistent by the speech engine.

2) The name(s) of the unique identifier(s) e.g., 1, 2, 3 . . . etc, A, B, C . . . etc. or some other unique identifier);

3) The positioning desired (e.g., left, lower right, monitor two right, print, copy, etc.).

Or, 4) Two or more names of unique identifier (s) e.g., 7 2 4 9.

Returning to the user's second command: "Place 3 4 5," the speech recognition engine will recognize the command as belonging to the invention's command list and will pass the command to the invention's application manager 56 which parses out the command being sent.

The application manager performs the following steps:

First, the application manager determines what type of command has been received:

Referring to FIG. 7, when the application manager parses out the command words in the sample command, 'place', '3', '4' & '5, it will identify the command as being a positioning command. The application manager will initiate the controller 54; passing to it the name of the graphical application windows to be sized and positioned on the computer screen (in this example, open application windows) associated with the numbers 3, 4, & 5. FIG. 7 The controller reads the configuration file to determine the positioning information for 3 graphical windows on a single monitor configuration and sizes and positions the graphical application windows FIG. 8 '3', '4', & '5' in accordance with the configuration parameters. 81, 82 & 83 (The user can override the configuration with specific positioning commands.)

In another other embodiment. When a computer user has a plurality of windows open on the desktop FIG. 6, with some windows partially obscured and others hidden behind other open windows, he/she can quickly organize the desktop with one voice command.

The computer user can look at the Windows task list, can count the task icons from left to right 61 and can reference them to issue a command to size and position one or more application windows referenced by the task icons. Needing to count the task icons is not as intuitive as the preferred embodiment, but it allows a computer user to size and position applications in one command instead of two.

To position two applications next to one another the computer user says, "Show Task 1 2."

The speech recognition engine will recognize the command as belonging to the invention's command list and will pass the command to the invention's application manager 56 which parses out the command being sent.

The application manager performs the following steps:

First, the application manager parses out the command words, 'task', '1' & '2', to determine what type of command has been received. Identifying the command as a task command; the invention will pass the command directly to the invention's controller. The controller will identify the graphical application windows associated with the numbers 1 and 2 on the task bar and read the configuration file for the positioning information associated positioning the two named graphical application windows. In the preferred embodiment of the invention, commands consisting of just numbers, e.g., "1 2" are positioning and sizing commands, instructing the invention to size and locate the open graphical application windows as set in the invention's configuration file which, by the default configuration, will position (resize and relocate) the graphical application window FIG. 9 referenced by the number 1 on the left half of the computer desktop 91, and position the graphical application window referenced by the number 2 on the right half of the computer desktop 92.

In another embodiment of the task command, the invention allows a computer user to set the invention's options such that the itemizer will continuously display a default list of a set of objects on the desktop, for example, a list of all open application windows, enabling the user to directly size and position or control the displayed set of objects (e.g., open application windows) without having to issue a first voice command.

In one or two simple voice commands graphical application windows can be sized and positioned, providing a novel ease of use and control over the GUI interface for computer users.

Similarly, the invention brings a novel ease of use and control of computer readable files. The invention integrates computer files with the GUI desktop, blurring the distinction between whether a computer file is already open and being displayed on the desktop or still just filed away because the invention allows a computer user to request, open and size and position computer readable files, almost as easily as he/she can size and position open graphical application windows.

The invention allows a user to issue voice commands to find and display lists of computer objects, including by way of illustration and not by way of limitation, recent documents, specific file types (e.g., Word files, or Excel files and PowerPoint files), internet favorites, and images. The invention allows a user to find computer objects based on date created, date modified, time, size, drive or folder location, and specific words in or associated with the computer objects.

Some examples of user requests include: "Show Recent Word and PowerPoint files," "Show Word files in the My Documents folder from last Friday containing Litene," "Show Favorite Directories" and "Show PowerPoint files in the Marketing directory."

To illustrate by example, the computer user says: "Show Word documents in My Documents from last Friday."

Figure 5:
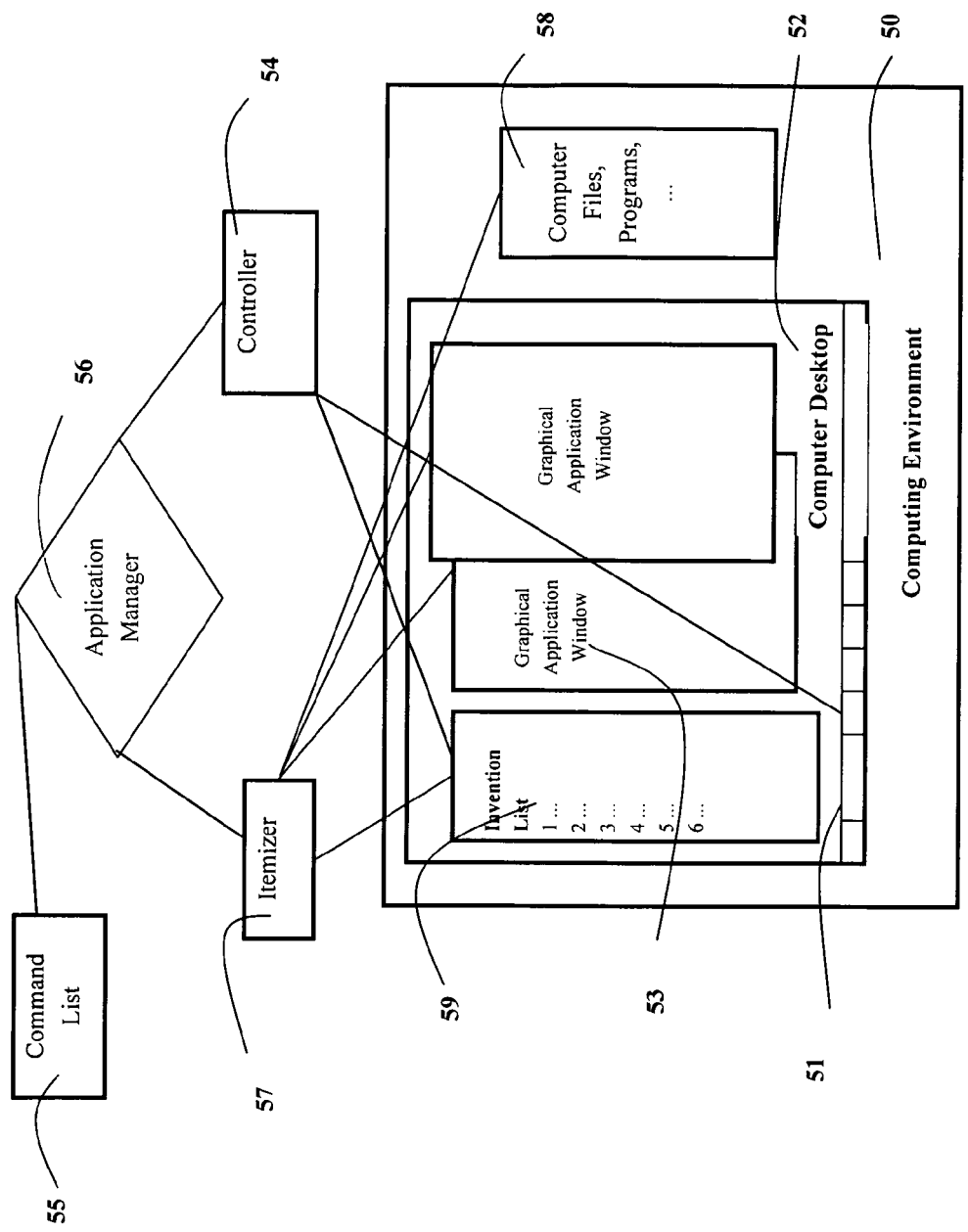
FIG. 5 is a schematic of the interrelationships between the components of the program.

Referring to FIG. 5, when the speech recognition engine recognizes the voice command as a command on the Invention's command list 55, it passes the command to the invention's application manager 56. The application manager then performs the following steps:

First, the application manager parses out the command words to determine what type of command has been received:

When the invention parses out the command words in the sample command, 'show,' 'Word documents,' 'My documents,' & 'last Friday' it identifies the command as a show command;

Since the command sent is a show command, the application manager invokes an itemizer 57, passing to the itemizer the type of objects requested by the user and any parameters requested by the user such as the drive, directory or subdirectory; dates & times; and/or specific search criteria, if any.

With the user's command, "Show Word documents in My Documents from last Friday", the itemizer first populates an internal list of all files and subdirectories in the specified directory. Next the itemizer uses a sequence of iterative steps to remove files that are not Word documents; that are not from last Friday; and don't contain the word "Litene."

Once the itemizer finds the objects in the set requested, it extracts the names and other characteristics of the objects in the set—the subdirectories in the My Documents folder and the Word files from last Friday containing the word "Litene"—then sorts the objects and uniquely labels them.

The itemizer displays the uniquely labeled list in a graphical application window or uniquely labels an arrangement of images (icons) in a graphical application window or windows on the computer's desktop 59.

Figure 10:
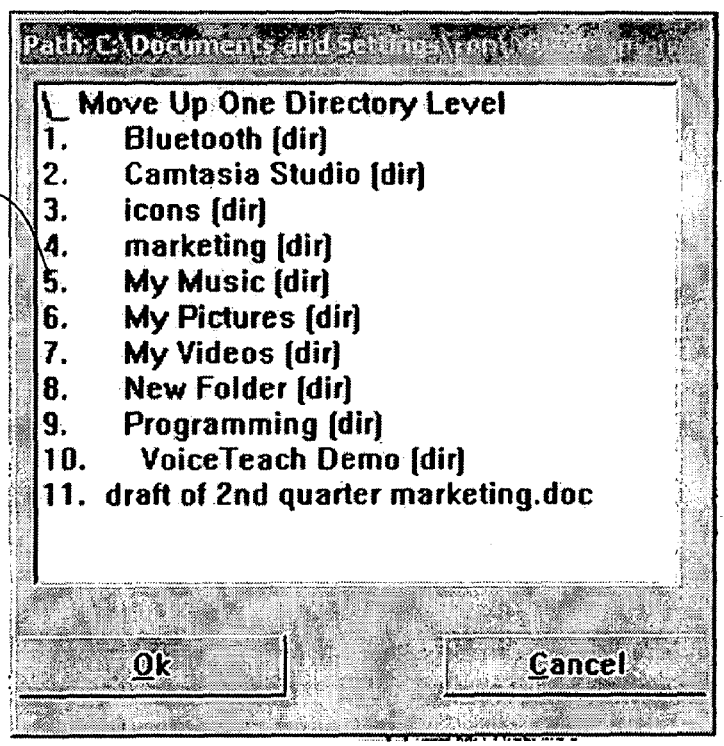
FIG. 10 is a representative screen display of the invention's list with a list of subdirectories in the My Document folder and the searched for file.

With the uniquely labeled list FIG. 10 or graphical display open and providing an precise reference to the objects on the list or in the graphical display:

STEP 2: The computer user issues a voice command that causes the invention to perform the desired control of uniquely labeled list 101, exactly as in the previous examples in which we illustrated how the invention resizes and repositions open graphical application windows.

A typical command consists of a unique identifier and the positioning desired. For example, the computer user says: "Place 11 Upper Right."

The speech recognition engine will recognize the command as belonging to the invention's command list, which will pass the command to the invention's application manager 56 which parses out the command being sent.

The application manager performs the following steps:

First, the application manager parses out the command words to determine what type of command has been received:

(a) commands consisting of a number or a series of numbers, or other unique identifiers, and a command word(s)

Figure 11:
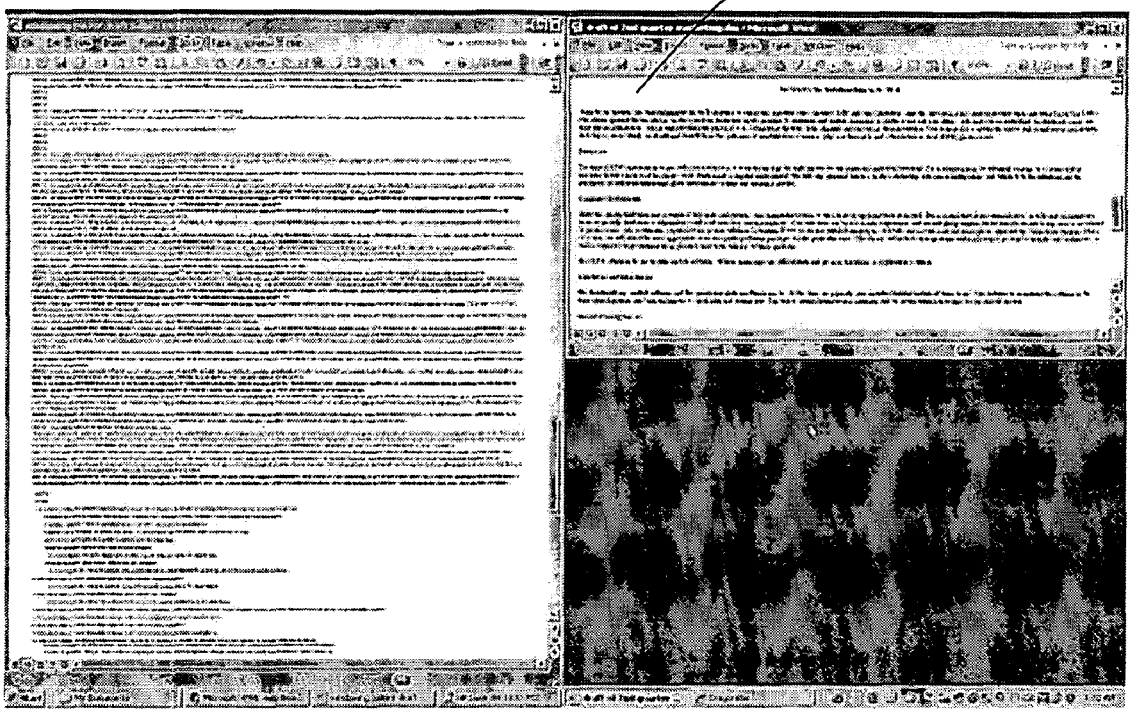
FIG. 11 is a representative screen display of the invention's positioning of a file that was opened and positioned in the upper right position of the display screen.

(b) a command consisting of a two or more numbers (or other unique identifiers), e.g., "5 14" (spoken as "five fourteen"); or When the invention parses out the command words in the sample command, 'Place,' '11' and 'upper right', it will identify the command as being a positioning command. The application manager will initiate the controller 54; passing to it the name of the object (in this example, a file) associated with the number 11 and the 'upper right' positioning command. The controller will read the configuration file for the positioning information associated with 'upper right'; open the file, and resize and position its graphical application window '11' FIG. 11 at the 'upper right' location 111.

Other embodiments of the invention offer the computer user several other novel capabilities and are illustrated in the following discussion and examples:

Another embodiment of the invention allows a computer user to navigate through a computer's drive, directory and folder structure with simple voice commands. With the numbered list of drives, directories & subdirectories (folders) FIG. 10 or a uniquely identified set of objects open on the desktop, the invention enables the computer user to use their voice to move through drives and directories with ease. Some example commands statements include: "Show 3,", "Move up one directory," and "Move Up 5 Levels."

STEP 2: With the numbered list of drives, directories & subdirectories (folders) FIG. 10 or a uniquely identified set of objects open on the desktop the computer user issues a second voice command:

"Show 4"

When the speech recognition engine recognizes the voice command as a command on the Invention's command list 55, it passes the command to the invention's application manager 56. The application manager then performs the following steps:

First, the application manager parses out the command words to determine what type of command has been received:

When the invention parses out the command words in the sample command, 'show,' '4' it identifies the command as a show command;

Since the command sent is a show command and the itemized list generated by a previous show command is already open, the application manager identifies the type of object (in this case, drive, directory or subdirectory) identified by the user, invokes an itemizer 57, and refreshes its list of parameters requested by the user (specifically the drive, directory or subdirectory information) and sends its refreshed list of parameters to the itemizer.

Referring back to the example where the computer user had requested, "Show Word documents in My Documents from last Friday", the itemizer first populates an internal list of all files and subdirectories in the newly specified directory. Next the itemizer uses a sequence of iterative steps to remove files that are not Word documents; that are not from last Friday; and don't contain the word "Litene."

Once the itemizer finds the objects in the set requested, it extracts the names and other characteristics of the objects in the set—the subdirectories in the marketing folder (the subdirectory associated with '4' on the referenced list FIG. 10) and the Word files from last Friday containing the word "Litene"—then sorts the objects and uniquely labels them.

Figure 12:
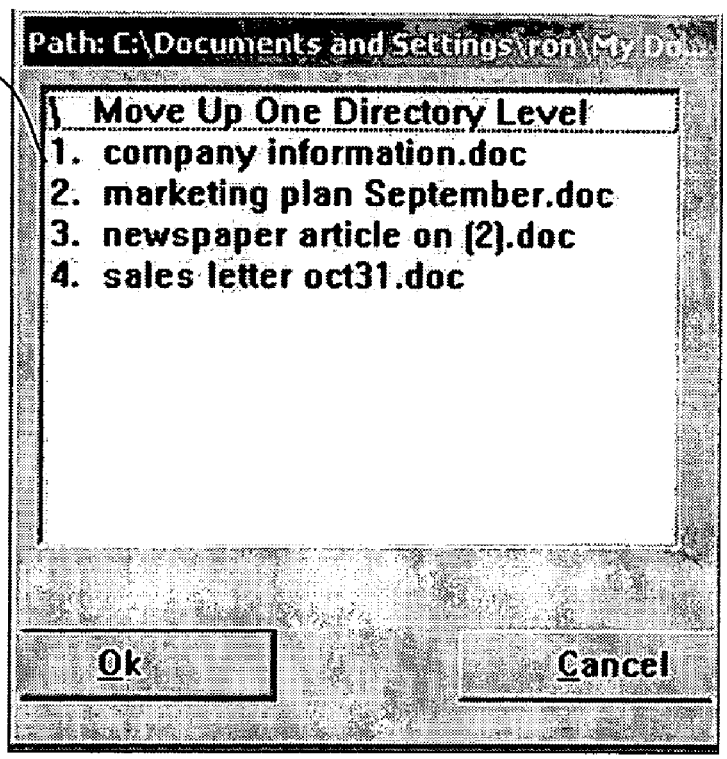
FIG. 12 is a representative screen display of the invention's list of the Marketing folder and the searched for files.

The itemizer refreshes the existing list and displays the refreshed uniquely labeled list in a graphical application window or uniquely labels an arrangement of images (icons) in a graphical application window or windows on the computer's desktop FIG. 12.

This unanticipated but significant embodiment of the invention allows a computer user to take advantage of the inventions numbered lists (or uniquely identified set of objects) and quickly navigate through a computer's drive, directory and folder structure with simple voice commands and maintain their original search specifications as they navigate.

Another embodiment of the invention allows a computer user to control objects with voice commands. With the numbered list of open application windows open on the desktop FIG. 7, the invention enables the computer user to state exactly what commands they wish to perform on which objects with a simple voice command. Some example commands statements include: "Print 8 1 18", to print the eighth, first, and eighteenth document on the invention's list; "Delete 11", to delete the eleventh item on the invention's list.

STEP 2: With the numbered list of open application windows (or a uniquely identified set of objects) open on the desktop, the computer user issues a second voice command that causes the invention to perform commands of one, some, or all of the items in the uniquely labeled list 61. The computer user says:

"Print 7 3"

This second voice command consists of:

1) The command to be executed;
2) The name(s) of the unique identifier(s) e.g., 1, 2, 3 . . . etc, A, B, C . . . etc. or some other unique identifier);

Returning to the user's second command: 'Print 7 3,' the speech recognition engine will recognize the command as belonging to the invention's command list and will pass the command to the invention's application manager 56 which parses out the command being sent.

The application manager performs the following steps:

First, the application manager determines what type of command has been received. When the application manager parses out the command words in the sample command, 'print,' '7' & '3,' it identifies the command as a control command and identifies the object (in this example, open application windows) associated with the numbers 7 & 3.

The application manager initiates the controller 54, passing to it the name of the graphical application windows to be controlled and the command to be carried out, 'print.' The controller sends the print command to the first specified application window, briefly pauses to allow the command to be executed, sends the print command to the second specified application window, and exits.

Another embodiment of the invention enables a computer user to view and/or control a set of specified application windows or computer readable files for a short time as specified by the computer user. With the numbered list of computer readable files FIG. 12 (or a uniquely identified set of objects) open on the desktop:

STEP 2: The computer user issues a (second) voice command:

"Control 1 2 and 4 for 15 Seconds."

The speech recognition engine will recognize the command as belonging to the invention's command list and will pass the command to the invention's application manager 56 which parses out the command being sent.

The application manager performs the following steps:

First, the application manager 56 determines what type of command has been received. When the application manager parses out the command words in the sample command, 'Control,' '1,' '2,' '4,' and '15 Seconds,' it identifies the command as a control command and identifies the object (in this example, computer readable files) associated with the numbers 1, 2 & 4.

The application manager initiates the controller 54, passing to it the name of the graphical application windows to be controlled and the commands to be carried out, 'control' and '15 seconds.' The controller opens, sizes, positions, and activates the first specified application window, pauses for the time specified (15 seconds in this example) to allow the user to view the file or control the application, activates the second specified application window This process of opening and displaying specified files and graphical application windows sequentially is repeated until all application windows specified by the original command have been activated. The process can be cancelled by the user with a cancel command at any time. The fact that the invention can be configured to display and to control graphical application windows on one, two, or more monitors, enabling a computer user to view and control application windows in multiple monitors with a single voice command offers significant advantages to prior art approaches.

In reference to FIG. 7, the invention allows a computer user working in an active application 92 to copy text from any open graphical application, or computer readable file with three voice commands. First, the user issues a "show" command, e.g., "Show Task List." As has been described, the invention displays a list of the open application windows on the desktop FIG. 7.

Step 2: The computer issues a command, "Copy 3"

The speech recognition engine will recognize the command as belonging to the invention's command list and will pass the command to the invention's application manager 56 which parses out the command being sent.

The application manager performs the following steps:

First, the application manager determines what type of command has been received. When the application manager parses out the command words in the sample command, 'Copy' & '3,' it identifies the command as a control command and identifies the object (in this example, an open application window) associated with the number 3.

Figure 13:
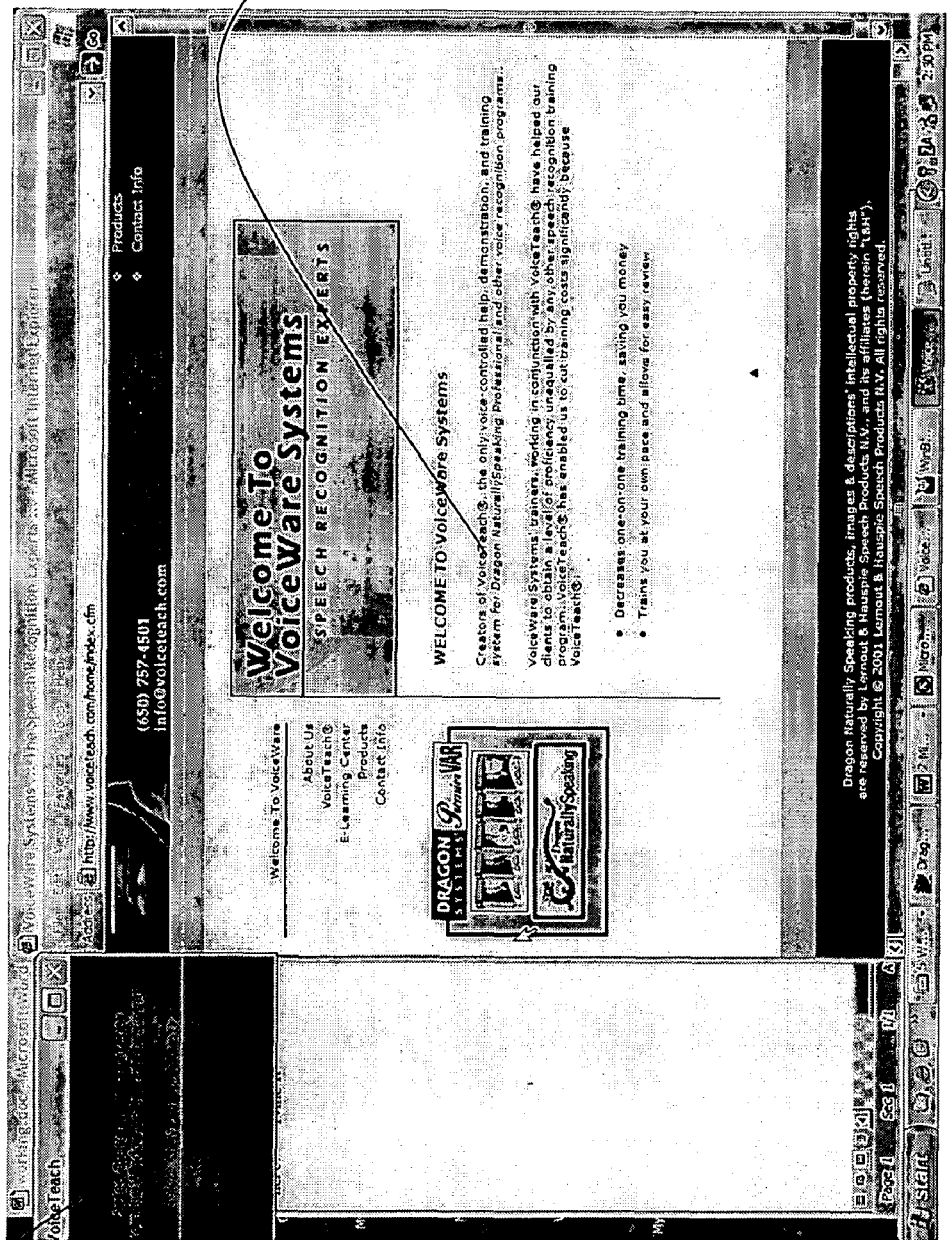
FIG. 13 is a representative screen display of the invention's temporary activation of a graphical application window.

The application manager initiates the controller 54, passing to it the name of the graphical application window to be controlled and the command to be carried out, 'copy.' The controller stores the existing clipboard contents to a temporary file, and clears the clipboard. In reference to FIG. 13, the controller temporarily activates the specified graphical application window 132.

With the clipboard empty, the controller starts a programming loop to copy any selected text into the clipboard. The invention's controller messages the computer user to locate and select text that they want to copy or how to cancel the procedure 131.

Step 3: the computer user issues a voice command to the particular speech recognition engine being used by the invention (and not to the invention) to select text. Once the speech recognition engine carries out the user's command, the invention's controller programming loop recognizes and captures the selected text, places it into the clipboard, ending the loop. In reference to FIG. 14, the application manager restores the input focus to the user's original window, and pastes the copied text at the original cursor position 141.

In an alternative embodiment of the invention, when the computer user issues an invention command, the application manager stores the name of the graphical application window that had input focus when the computer user issued the command. When the command(s) has been completed, the application manager reads the stored name of the user's original graphical application window and directs the focuser to reactivate the said window and to return input focus to the user's original cursor position.

In other embodiments of the invention, the invention makes its features accessible through the use of a keyboard or through the use of other input devices such as a tablet PC. By way of example and not by way of limitation, a computer user can invoke the invention with the press of a Function key or keystroke combination to display a set of items (open graphical application windows, or a list of files in a subdirectory, etc., as is specified in the invention's options file). If the computer user wishes to view an alternative set of items say, recent word documents, the computer user will press a "w" or other key as indicated by the invention's display to call up word documents.

Figure 8:
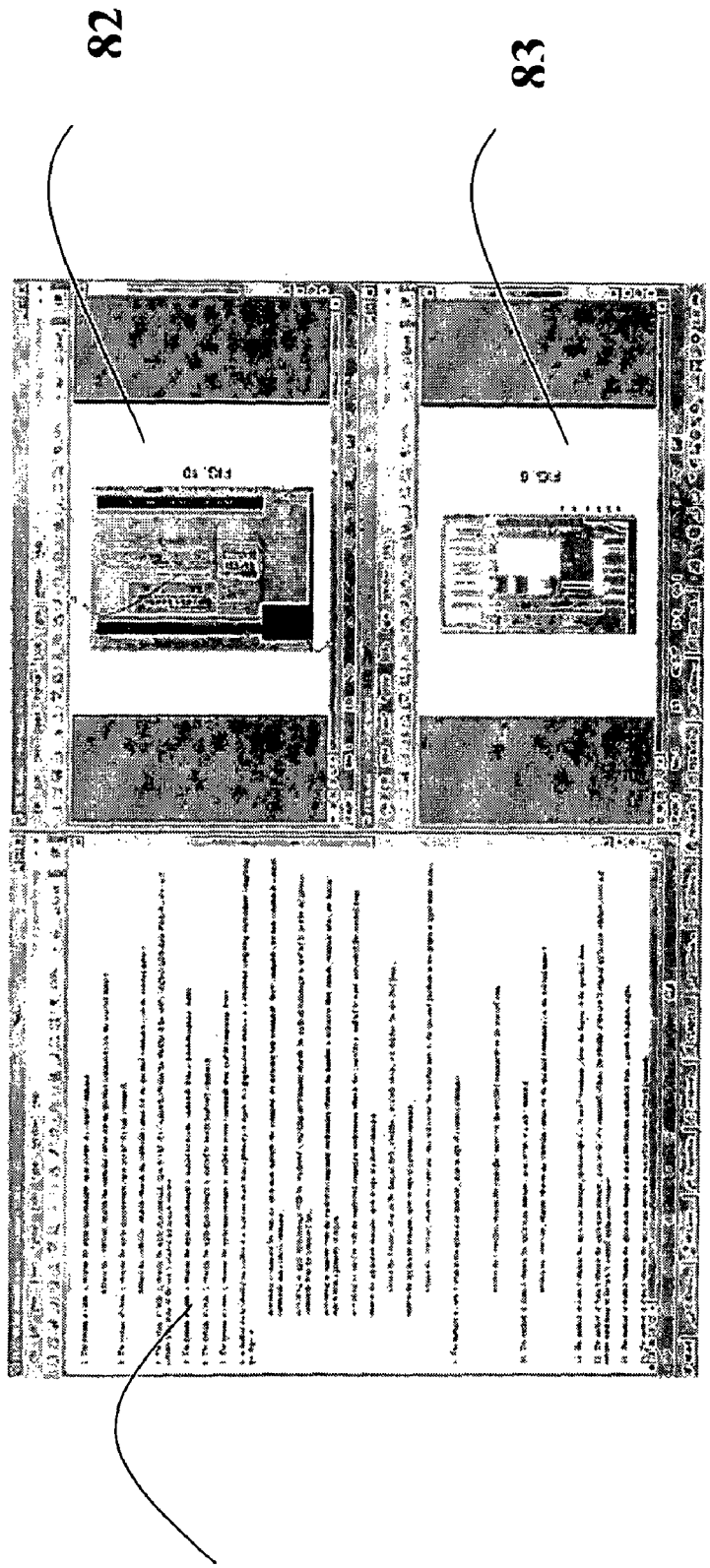
FIG. 8 is a representative screen display of the invention's tiling of three application windows on a computer system with one display screen in response to an invention command.

If a user, accessing the invention through a keyboard, wishes to display and control the documents listed by the invention's itemizer as previously described, the user will type shortcut keys. For instance, if the computer user types "1 4 3 8 <enter>" (with spaces or some other delimiter typed between the numbers), the invention will tile the documents as illustrated in FIG. 8; or if he/she types "9 p", the invention will print the files or application windows referenced by 9th item on the invention's list.

The present invention offers significant advantages to prior art approaches. The present invention greatly speeds up and simplifies a computer user's access to the desktop, computer files and other sets of objects previously listed. Using voice or keyboard to access this invention, a computer user can quickly view and control the user's programs and documents whether they're open or not. The invention brings additional benefits to computer users with repetitive stress injuries because it simplifies input and eliminates mousing for a wide range of computer control and manipulations.

The invention makes it possible for a computer user to quickly position, size, and control any single object or any specified objects in a set of objects on the user's computer, including open graphical application windows on the desktop, Internet favorites, programs, favorite programs, recent documents (including recent word, excel, html, PowerPoint, WordPerfect, text, pictures, or any other type of documents), in a wide variety of ways with a single voice command or with a couple of keystrokes. These enhancements bring an ease of use and a power that do not exist in prior art.

This invention brings this ease-of-use and power to a computer user without forcing the computer user to learn a new interface. Instead, the invention works in conjunction with existing graphical user interfaces, allowing the computer user to operate the computer in the manner in which the user is accustomed, using the invention's enhancements to give him/her greater control and productivity as needed.

It should be emphasized that the above-described embodiments, particularly any "described" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure. The detail presented above is given by way of illustration, not limitation.

We claim:

1. A non-transitory computer readable medium comprising code segments for facilitating the control of at least one object from a plurality of objects in a graphical user interface in a windowed computing environment, the code segments for:
   processing a voice command, wherein the voice command consists of:
      a selection command to select an object from a list; and
      a user-specified position command to position the selected object on a monitor as a graphical application window at a position comprising one of a left half of the monitor and a right half of the monitor,
      wherein:
         the window is sized to substantially cover an area of the monitor corresponding to the user-specified position command; and
         the position command comprises one of the words "left" and "right".

2. The computer readable medium of claim 1, wherein the selection command consists of one word.

3. The computer readable medium of claim 2, wherein the selection command consists of a numeral.

4. The computer readable medium of claim 1, wherein the position command consists of one word.

5. The computer readable medium of claim 4, wherein the position command consists of one of the words "left" and "right".

6. The computer readable medium of claim 1, wherein:
   the position comprises one of an upper right of the monitor, a lower right of the monitor, an upper left of the monitor, and a lower left of the monitor; and
   the position command comprises one of the phrases "upper right", "lower right", "upper left" and "lower left".

7. The computer readable medium of claim 1, wherein the position command identifies one of a plurality of monitors.

8. The computer readable medium of claim 1, wherein the objects comprise a plurality of files.

9. The computer readable medium of claim 1, wherein the objects comprise a plurality of application programs.

10. The computer readable medium of claim 1, wherein the selected object is displayed on the monitor as a new graphical application window.

11. The computer readable medium of claim 1, wherein the window is sized to cover substantially half of the monitor.

12. A non-transitory computer readable medium comprising code segments for facilitating the control of at least one object from a plurality of objects in a graphical user interface in a windowed computing environment, the code segments for:
   processing a voice command, wherein the voice command consists of:
      a selection command to select an object from a list; and
      a position command to position the selected object in a selected one of a left half and right half of a monitor,
      wherein:
         the object is sized to cover substantially half of the monitor; and
         the position command comprises one of the words "left" and "right".

13. The computer readable medium of claim 12, wherein the selection command consists of one word.

14. The computer readable medium of claim 13, wherein the selection command consists of a numeral.

15. The computer readable medium of claim 12, wherein the position command consists of one word.

16. The computer readable medium of claim 15, wherein the position command consists of one of the words "left" and "right".

17. The computer readable medium of claim 12, wherein the position command further identifies one of a plurality of monitors.

18. The computer readable medium of claim 12, wherein the objects comprise a plurality of files.

19. The computer readable medium of claim 12, wherein the objects comprise a plurality of application programs.

20. The computer readable medium of claim 12, wherein the objects comprise a plurality of windows.

21. A non-transitory computer readable medium comprising code segments for facilitating the control of at least one object from a plurality of objects in a graphical user interface in a windowed computing environment, the code segments for:
   processing a voice command, wherein the voice command consists of:
      a selection command to select an object from a list; and
      a position command to position the selected object in a selected one of a upper right, lower right, upper left and lower left of a monitor,
      wherein:
         the object is sized to cover substantially one-quarter of the monitor; and
         the position command comprises one of the phrases "upper right", "lower right", "upper left" and "lower left".

22. The computer readable medium of claim 21, wherein the selection command consists of one word.

23. The computer readable medium of claim 22, wherein the selection command consists of a numeral.

24. The computer readable medium of claim 21, wherein the position command consists of one of the phrases "upper right", "lower right", "upper left" and "lower left".

25. The computer readable medium of claim 21, wherein the position command further identifies one of a plurality of monitors.

26. The computer readable medium of claim 21, wherein the objects comprise a plurality of files.

27. The computer readable medium of claim 21, wherein the objects comprise a plurality of application programs.

28. The computer readable medium of claim 21, wherein the objects comprise a plurality of windows.

29. A method of controlling at least one object from a plurality of objects in a graphical user interface in a windowed computing environment, the method comprising:
   processing a voice command, wherein the voice command consists of:
      a selection command to select an object from a list; and
      a user-specified position command to position the selected object on a monitor as a graphical application window at a position comprising one of a left half of the monitor and a right half of the monitor; and
   positioning the selected object on the monitor at the position,
      wherein:
         the window is sized to substantially cover an area of the monitor corresponding to the user-specified position command; and
         the position command comprises one of the words "left" and "right".

30. A method of controlling at least one object from a plurality of objects in a graphical user interface in a windowed computing environment, the method comprising:
 processing a voice command, wherein the voice command consists of:
  a selection command to select an object from a list; and
  a position command to position the selected object in a selected one of a left half and right half of a monitor; and
 positioning the selected object in the selected one of the left half and right half of the monitor,
 wherein:
  the object is sized to cover substantially half of the monitor; and
  the position command comprises one of the words "left" and "right".

* * * * *